United States Patent
Ohkubo

[19]

[11] Patent Number: 6,116,395
[45] Date of Patent: Sep. 12, 2000

[54] CLUTCH DISK AND A CLUTCH DISK ASSEMBLY

[75] Inventor: Mamoru Ohkubo, Neyagawa, Japan

[73] Assignee: Exedy Corporation, Osaka, Japan

[21] Appl. No.: 09/136,368

[22] Filed: Aug. 19, 1998

[30] Foreign Application Priority Data

Aug. 29, 1997 [JP] Japan .................................. 9-234543

[51] Int. Cl.$^7$ .................................................. F16D 13/60
[52] U.S. Cl. .................... 192/52.3; 192/52.6; 192/107 C
[58] Field of Search ................... 192/52.6, 52.3, 192/107 C

[56] References Cited

U.S. PATENT DOCUMENTS

| | | | |
|---|---|---|---|
| 2,135,126 | 11/1938 | Harwood | 192/52.3 |
| 4,858,742 | 8/1989 | Cameron | 192/107 C |
| 4,903,814 | 2/1990 | Tomotake et al. | 192/107 C |
| 4,949,831 | 8/1990 | Ohga et al. | 192/107 C |
| 4,993,531 | 2/1991 | Villata | 192/107 C |
| 5,135,094 | 8/1992 | De Briel et al. | 192/107 C X |
| 5,337,870 | 8/1994 | Hays | 192/107 C X |
| 5,662,199 | 9/1997 | Chevallier | 192/107 C |

FOREIGN PATENT DOCUMENTS

| | | | |
|---|---|---|---|
| 233297 | 1/1959 | Australia | 192/107 C |
| 1170215 | 11/1969 | United Kingdom | 192/107 C |

*Primary Examiner*—Charles A Marmor
*Assistant Examiner*—Ha Ho
*Attorney, Agent, or Firm*—Shinjyu Global IP Counselors, LLP

[57] ABSTRACT

A clutch disk is provided with a cushioning plate 16 to prevent an eccentric abrasion of its friction facings. The clutch disk does not use rivets and has a cushioning function. The clutch disk includes a pair of friction facings 15$a$ and 15$b$ and a cushioning plate 16. The cushioning plate 16 includes in a fixing part 16$a$, a plurality of first installation parts 16$b$, a plurality of second installation parts 16$c$, a plurality of first connecting parts 16$d$, and a plurality of second connecting parts 16$e$. The first installation parts 16$b$ have first friction facings 15$a$ installed thereon. The first installation parts 16$b$ with their first friction facings 15$a$ extend from the fixing part 16$a$ to an outer circumferential side of the cushioning plate 16. The second installation parts 16$c$ have second friction facings 15$b$ installed thereon. The second installation parts 16$c$ with their second friction facings 15$b$ are disposed between the first installation parts 16$b$ in a circular direction in a location different from that of the first installation parts 16$b$ in an axial direction. The first connecting parts 16$d$ connect one of the ends of the first and second installation parts 16$b$ and 16$c$ together in a circular direction. The second connecting parts 16$e$ connect the other ends of the first and second installation parts 16$b$ and 16$c$ together in a circular direction.

32 Claims, 4 Drawing Sheets

CLUTCH DISK AND A CLUTCH DISK ASSEMBLY

BACKGROUND OF THE INVENTION

1. Field of the Invention

The present invention generally relates to a clutch disk for clutch disk assembly. More specifically, the present invention relates to a clutch disk assembly with a clutch disk, which together form a part of clutch device.

2. Background Information

A clutch disk assembly is a device for transmitting a torque between a first rotary member on an input side and a second rotary member on an output side. A clutch disk assembly generally includes a clutch disk having a pair of friction facings, an input plate to which a clutch disk is fixedly coupled on the outer circumference, an output hub, and a dampening part to connect the input plate and the output hub in a circular direction. In the clutch disk assembly, when one of the friction facings is pressed against a flywheel on an engine side by a pressure plate of a clutch cover assembly, the clutch disk is held between the flywheel and the pressure plate, and a torque of the flywheel on the engine side is input to the input plate via the clutch disk. The torque is then transmitted to the output hub via the dampening part, and is output to a shaft on an output side.

Thus, a torque is transmitted when the clutch is connected by pressing the clutch disk against the flywheel. In order to ease a shock in connecting the clutch, a cushioning plate is used for some clutch disks. Generally, six to nine pieces of cushioning plates are used in a circular direction. Since each cushioning plate has a wavy shape in a circular direction, the cushioning plate deforms elastically when the clutch disk is pressed against the flywheel. The elastic deformation works as a cushion, leading to easing a shock in connecting the clutch. The friction facings are annular members, which are typically installed in opposite side surfaces of a cushioning plate by rivets.

However, when rivets are used as described above, the thickness or length of the size of the clutch disk in an axial direction has some limitations. Therefore, it is thought that instead of using rivets, the friction facings can be installed by simultaneous moldings. However, when friction facings are installed by molding, the function of the clutch disk (referred to as a cushioning function hereafter) acting to absorb shock is lost.

One method, which has been developed to attempt to overcome such problems, is described in Japanese Laid-Open Patent Publication No. 59-50229. This publication discloses a method to install a friction facing in a fan-like configuration on the outer circumference of the disk plate which has an evenness divided in a circular direction by a radial cutout. In the method disclosed in Japanese Laid-Open Patent Publication No. 59-50229, a step-like part having a cushioning function is located in the inner circumferential side of the lining part (a part in which a facing is installed). Consequently, there is a difference between elasticity of the outer circumference of the lining part in an axial direction and elasticity of the inner circumference of the lining in an axial direction. Therefore, when a clutch disk is pressed against a flywheel by a pressure plate, an uneven load is applied to a friction facing because elastic reaction forces between the inner and outer circumferences of the lining parts are different. As the result, the friction facings are abraded eccentrically by repeating the clutch operation.

In view of the above, there exists a need for a clutch disk and clutch disk assembly which overcomes the above mentioned problems in the prior art. This invention addresses this need in the prior art as well as other needs, which will become apparent to those skilled in the art from this disclosure.

SUMMARY OF THE INVENTION

An object in accordance with the present invention is to provide a clutch disk and a clutch disk assembly which have a cushioning function, does not have a rivet, and have a structure in which an eccentric abrasion of a friction facing is prevented.

The object in accordance with the present invention is basically attained by providing a clutch disk of a clutch disk assembly between first and second rotary members to transmit a torque therebetween. The clutch disk in accordance with the present invention has a plurality of friction facings coupled to a cushioning plate. The friction facings are arranged to be pressed against the first rotary member. The cushioning plate includes a fixing part, a plurality of first installation parts, a plurality of second installation parts, a plurality of first connecting parts and a plurality of second connecting parts. The fixing part is connected with the second rotary part. A plurality of first installation parts extends from the fixing part toward the outer circumferential side and in which each of the friction facings are installed. The second installation parts are disposed between first installation parts in a circular direction so that their locations are different in an axial direction from that of the first installation parts. The friction facings are installed on each of the second installation parts. The first connecting parts connect the forward ends of the first installation parts in a circular direction and the rearward ends of the second installation parts in a circular direction. The second connecting parts connect the rearward ends of the first installation parts in a circular direction and the forward ends of the second installation parts in a circular direction.

When the friction facings of the clutch disk presses against the first rotary body, a torque from the first rotary member is transmitted via the friction facings, the first and second installation parts and the fixing part to the second rotary member connected with the fixing part. When the friction facings are pressed against the first rotary member, the cushioning plate deforms elastically so that the locations of the first installation parts coincide with that of the second installation parts in an axial direction. The elastic deformation of the cushioning plate plays a role to ease a shock when the friction facings are pressed against the first rotary member.

In one embodiment of the present invention, the elastic deformations of the first and second connecting parts and of the first and second installation parts generate a cushioning effect. Therefore, the difference between the elastic reaction force of the outer circumferences of the first and second installation parts and that of their inner circumferences are small. Likewise, the eccentric abrasion of the friction facings is prevented. Since the structure in which the first and second installation parts with difference in level in an axial direction are connected in a circular direction is adopted, it is easy to set an elasticity larger compared with the structure in which a channel is formed between the first and second installation parts, when an equal plate is used.

In a clutch disk in accordance with the present invention, first connecting parts in a clutch disk connect the outer circumferences of one end of each of the first installation parts in a circular direction and that of the second installation parts. On the other hand, second connecting parts connect the inner circumferences of each of the other end of the first installation parts in a circular direction and that of the second installation parts.

In this embodiment of the present invention, both the outer circumferences of one ends of the first and second installation parts are connected each other by the first connecting parts, and both the inner circumferences of the other ends of the first and second installation parts are connected each other by the second connecting parts. Therefore, there exists a space on the inner circumferential sides of the first connecting parts and on the outer circumferential sides of the second connecting parts. As the result, when the cushioning plate is deformed elastically, it can expand into the space, resulting in a reduction of a stress of the cushioning plate when it deforms.

In addition, since the first and second installation parts are connected alternately in the outer and inner circumferences, the difference between the elastic reaction force of the outer circumference of the first and second installation parts and that of the inner circumference becomes smaller, which leads to a prevention of an eccentric abrasion.

A clutch disk in accordance with the present invention has a fixing part and a plurality of first installation parts located in a plane, which coincides in an axial direction in the clutch disk as set forth above. In the clutch disk of the present invention, there is no difference in level in an axial direction between a fixing part and the first installation parts, which leads to an easy production and an improvement in precision of shape and size.

A clutch disk in accordance with the present invention has a friction facing which is bonded to the first and second installation parts in a clutch disk.

In the clutch of the present invention, the friction facings, which previously have been fixedly coupled in a conventional manner using rivets, is installed in the cushioning plate by means of bonding. As the result, the size of the clutch disk in an axial direction can be shortened. In addition, the production cost can be reduced and the inertia of the clutch disk can be small.

A clutch disk in accordance with the present invention preferably has its friction facings molded to the first and second installation parts in the clutch disk as set forth above. In the clutch of the present invention, the friction facings, which were previously fixedly coupled by rivets in the past, are installed in a cushioning plate by means of molding. As the result, the size of the clutch disk in an axial direction is shortened. Moreover, its production cost can be reduced, and the inertia of the clutch disk can be small.

A clutch disk in accordance with the present invention has first and second installation parts in which a hole is formed in each of the installation parts of the clutch disk as set forth above. In addition, the friction facings are molded to both surfaces of the first installation parts and its respective hole, and to both surfaces of the second installation parts and its respective hole. Thus, the friction facing material within the holes of the first installation parts connect both friction facings together that are installed in both surfaces of the first installation parts. The friction facing material within the holes of the second installation parts connect both friction facings together that are installed in both surfaces of the second installation parts.

In the clutch of the present invention, since the molded friction facings of both surfaces of the installation parts are connected via the holes, the extent of connection between the cushioning plate and the friction facings is high.

A clutch disk assembly in accordance with the present invention is a clutch disk assembly for transmitting a torque between a first and second rotary members, and includes a friction facing, a connecting portion and a cushioning plate. A plurality of friction facings are installed in the clutch disk assembly and can be pressed against the first rotary member. The connecting portion is connected with the second rotary member. The cushioning plate includes in a body a fixing part, a plurality of first installation parts, a plurality of second installation parts, a plurality of first connecting parts and a plurality of second connecting parts. The fixing part is fixedly coupled to the connecting portion. The plurality of first installation parts, which extend from the fixing part toward an outer circumferential side, are formed in the cushioning plate. The second installation parts are disposed between the first installation parts in a circular direction so that their locations are different in an axial direction from the locations of the first installation parts. The first connecting parts connect one end of each of the first installation parts in a circular direction and one end of each of the second installation parts in a circular direction. The second connecting parts connect the other end of each of the first installation parts in a circular direction and the other end of each of the second installation parts in a circular direction.

When the friction facings of this clutch disk assembly are pressed against the first rotary body, a torque of the first rotary body is transmitted via friction facings, first and second installation parts and fixing part to the second rotary member which is connected to the fixing part. When the friction facings are pressed against the first rotary member, the cushioning plate deforms elastically so that the location of the first installation parts coincide with that of the second installation parts in an axial direction. The elastic deformation of the cushioning plate plays a role to ease a shock when the friction facings are pressed against the first rotary member.

In this clutch disk assembly of the present invention, elastic deformations of the first and second connecting parts, which connect the first and second installation parts together in a circular direction, generate a cushioning effect. Therefore, the difference between the elastic reaction force of the outer circumferences of the first and second installation parts and that of the inner circumference is small. Moreover, the eccentric abrasion of the friction facings are prevented. Since the structure in which the first and second installation parts with difference in level in an axial direction are connected in a circular direction is adopted, it is easy to set an elasticity larger compared with the structure in which a channel is formed between the first and second installation parts, and in which an equal plate is used.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
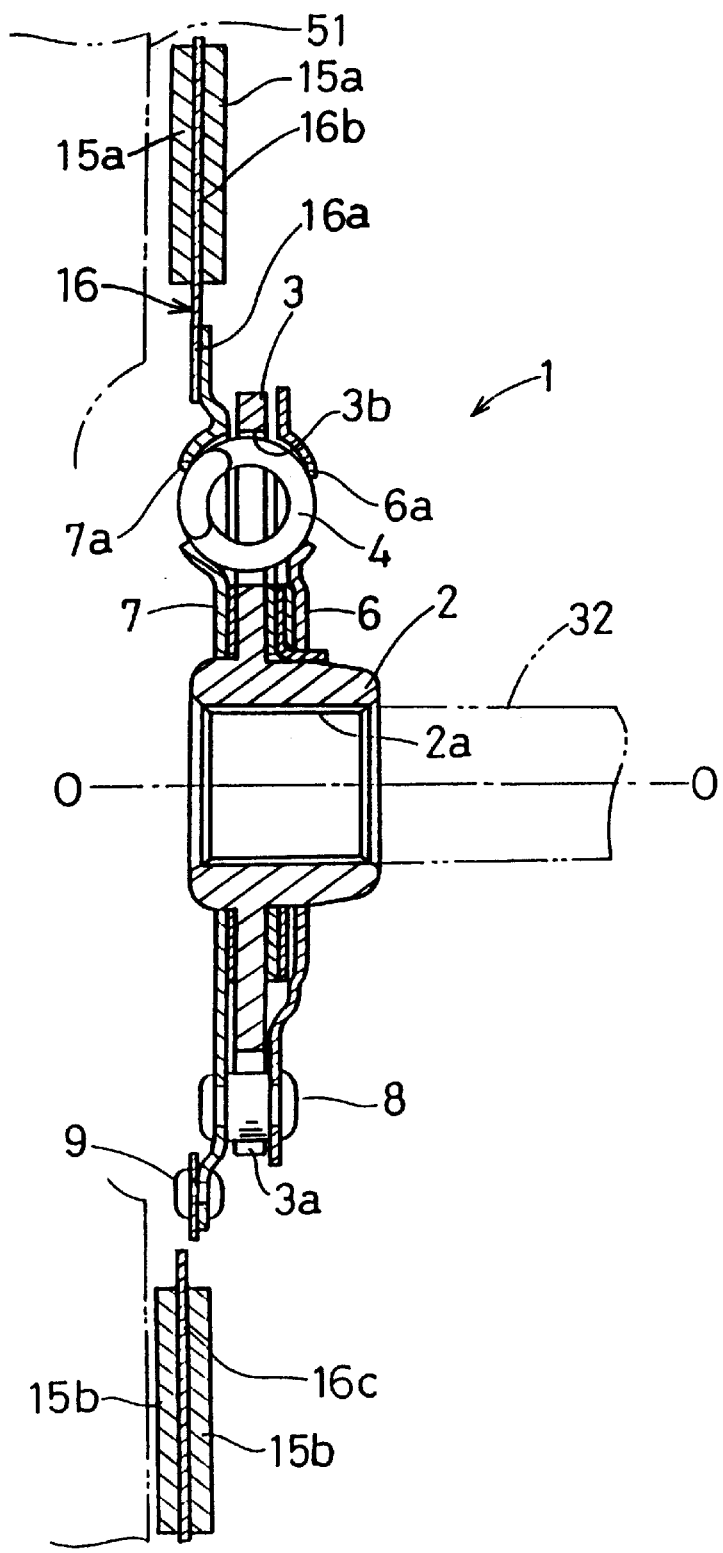
FIG. 1 is a cross-sectional view of a clutch disk assembly in accordance with one embodiment of the present invention.
Figure 2:
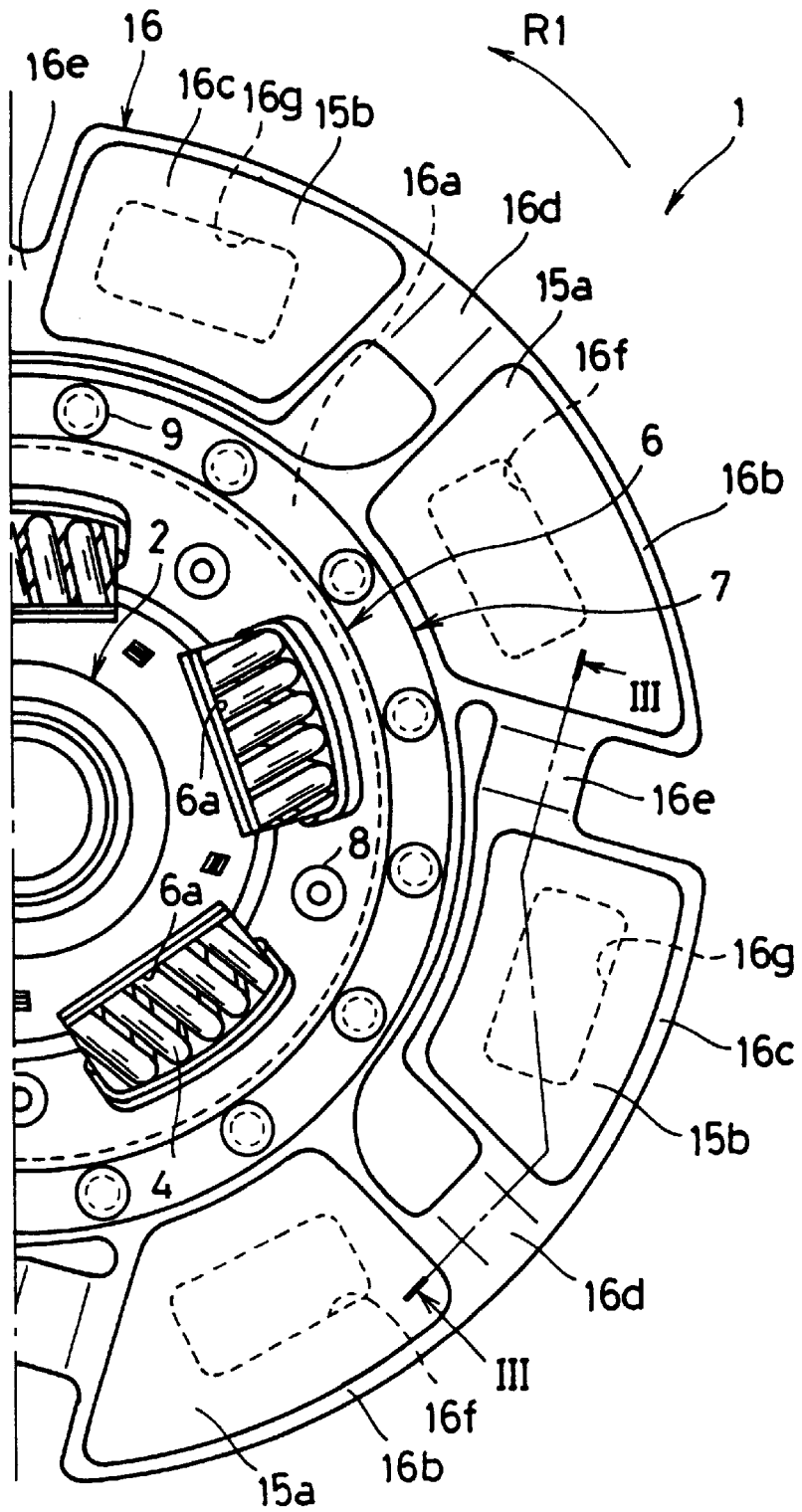
FIG. 2 is a partial elevational view the clutch disk assembly illustrated in FIG. 1 in accordance with the present invention.

Referring initially to FIGS. 1 and 2, a clutch disk assembly 1 is illustrated in accordance with an embodiment of the present invention. The clutch disk assembly 1 is designed to transmit a torque from the flywheel 51 on the engine side (the left side as viewed in FIG. 1) to the main drive shaft 32 on the transmission side (the right side as viewed in FIG. 1). In FIG. 1, the line O—O represents the main axis of rotation of the clutch disk assembly 1.

At the center of the clutch disk assembly 1, a spline hub 2 is disposed which is fixedly coupled to the main drive shaft 32. The spline hub 2 has a spline hole 2a formed in its inner circumferential face, which engages with spline teeth of the main drive shaft 32 (not shown in Figures). The spline hub 2 basically includes in a body portion or part with a flange part 3 projecting outwardly from the outer circumferential side of the spline hub 2.

A retaining plate 6 and a clutch plate 7 are disposed on the outer peripheral surface of the spline hub 2 with the flange part 3 located between them. Both the retaining plate 6 and the clutch plate 7 are preferably generally disk-shaped members. Both the retaining plate 6 and the clutch plate 7 are mounted on the spline hub 2 so as to be rotatable relative to the spline hub 2. The outer circumference of the retaining plate 6 is connected with the clutch plate 7 by a plurality of stop pins 8.

The flange part 3 of the spline hub 2 has a plurality of cutouts 3a and a plurality of windows 3b formed therein. The cutouts 3a are formed at equally spaced, apart intervals and arranged in a circular pattern at the outer circumference of the flange part 3 for receiving the stop pins 8 therein. Similarly, the window holes 3b of the flange part 3 are formed at equally spaced, apart intervals and arranged in a circular pattern at the outer circumference of the flange part 3 for receiving torsion springs 4 therein. The above mentioned stop pins 8 are disposed within the cutouts 3a and fixedly couple the retaining plate 6 and the clutch plate 7 together. The torsion springs 4 are disposed in window holes 3b for elastically coupling the retaining plate 6 and the clutch plate 7 together.

In particular, window holes 6a and 7a are formed in the retaining plate 6 and clutch plate 7, respectively, which correspond to the window holes 3b of the flange part 3. The window holes 6a are formed by cutting and raising portions of the retaining plate 6. Likewise, the window holes 7a are formed by cutting and raising portions of the clutch plate 7. The window holes 6a and 7a overlie the torsion springs 4 from outside to retain the torsion springs 4 in the window holes 3b of the flange part 3. The ends of the window holes 6a and 7a engage the ends of the torsion springs 4.

Figure 4:
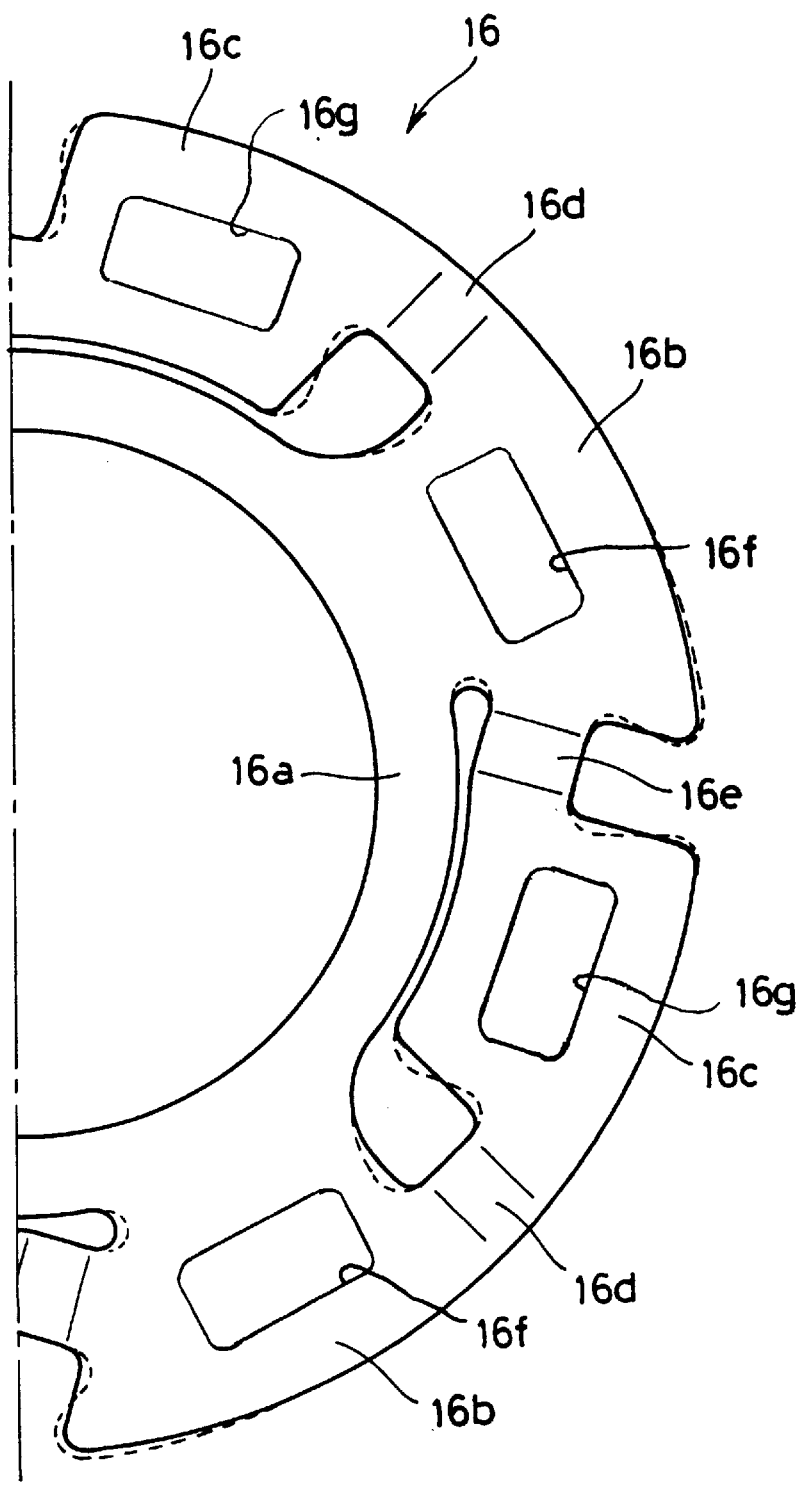
FIG. 4 is a partial elevational view of the cushioning plate utilized in the clutch disk assembly illustrated in FIGS. 1–3 in accordance with the present invention, with the normal state of the cushioning plate shown in solid lines and the deformed state of the cushioning plate shown in broken lines.

As shown in FIG. 2, a piece of annular cushioning plate 16 is fixedly coupled to the outer circumference of the clutch plate 7 by a plurality of rivets 9. As shown in FIGS. 2 and 4, the cushioning plate 16 is basically formed of an annular fixing part 16a, a plurality of first installation parts 16b, a plurality of second installation parts 16c, a plurality of first connecting parts 16d and a plurality of second connecting parts 16e. A hole 16f is formed at the center of each of the first installation parts 16b, while a hole 16g is form ed at the center of each of the second installation parts 16c.

The fixing part 16a is fixedly coupled to the outer circumference of the clutch plate 7 by a plurality of rivets 9. The first installation parts 16b extend from the outer circumferential edge of the fixing part 16a toward the outer circumferential side of the cushioning plate 16. In the preferred embodiment, four of the first installation parts 16b are disposed at equal intervals and arranged in a circular pattern about the fixing part 16a. The first installation parts 16b lie in a plane that coincides or substantially coincides with the plane of the fixing part 16a. In other words, the first installation parts 16b and the fixing part 16a substantially coincide with each other in a plane, which is substantially perpendicular to the rotational axis O—O of the clutch assembly 1 (See FIG. 1). This structure is advantageous in that it is easier to make the cushioning plate 16 as well as to maintain the accuracy of shape and size of the cushioning plate 16.

The second installation parts 16c are disposed between adjacent first installation parts 16b in a circular direction about the fixing part 16a. The second installation parts 16c lie in a different plane from the first installation parts 16b. In other words, the plane of the first installation parts 16b and the plane of the second installation parts 16c are axially spaced apart from each other along the rotational axis O—O of the clutch assembly 1 (See FIG. 1). This offsetting of the first installation parts 16b from of the second installation parts 16c is accomplished by the first connecting parts 16d and the second connecting parts 16e.

Figure 3:
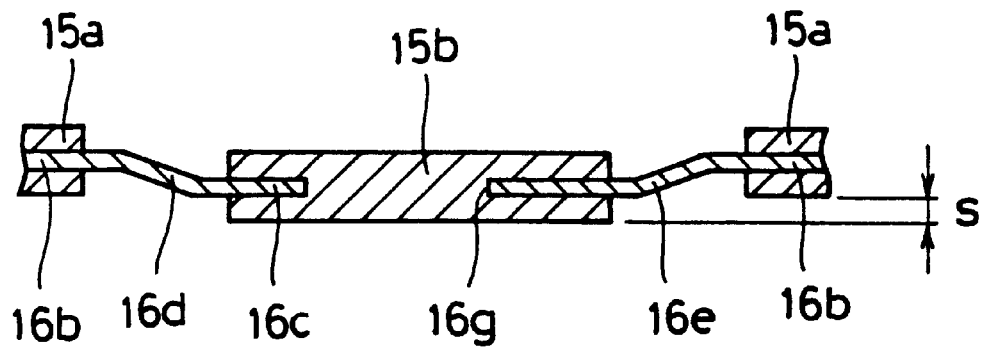
FIG. 3 is a partial cross-sectional view of the clutch disk assembly illustrated in FIGS. 1 and 2 as seen along section line III—III of FIG. 2.

In particular, as shown in FIGS. 2 and 4, the first connecting parts 16d connect outer circumferential portions of the first installation parts 16b to outer circumferential portions of the second installation parts 16c. More specifically, the first connecting parts 16d are coupled to the forward end portions of the first installation parts 16b in a positive rotational direction R1. The first connecting parts 16d are also coupled to the rearward end portions of the second installation parts 16c in a positive rotational direction R1. The first connecting parts 16d are inclined to a plane extending perpendicular to the axis O—O (See FIGS. 2 and 3). In FIG. 2, the positive rotational direction R1 shows a positive rotational direction of the flywheel 51 and the clutch disk assembly 1.

As shown in FIGS. 2 and 4, the second connecting parts 16e connect inner circumferential portions of the first installation parts 16b to inner circumferential portions of the second installation parts 16c. More specifically, the second connecting parts 16e are coupled to the rearward end portions of the first installation parts 16b in a positive rotational direction R1. The second connecting parts 1 6e are also coupled to the forward end portions of the second installation parts 16c in a positive rotational direction R1. The second connecting parts 16e are inclined to a plane extending perpendicular to the rotational axis O—O (See FIGS. 2 and 3). In FIG. 2, the positive rotational direction R1 shows a positive rotational direction of the flywheel 51 and the clutch disk assembly 1.

The friction facings 15a are preferably made of an organic material, which provides a relatively good engagement of the clutch disk with the flywheel 51 and a pressure plate (not shown in the Figures). The friction facings 15a are installed on both side surfaces of each of the four of the first installation parts 16b. The friction facings 15b are preferably made of a metallic material, which has excellent heat resistance and abrasion resistance properties. The friction facings 15b are installed in both on both side surfaces of each of the four of the second installation parts 16c. These friction facings 15a and 15b are preferably molded to the first and second installation parts 16b and 16c of the cushioning plate 16, respectively. Therefore, as shown in FIG. 2, the friction facings 15a, which are installed on both surfaces of each of the first installation parts 16b, are connected together via the holes 16f formed in the first installation parts 16b. The friction facings 15b, which are installed on both surfaces of each of the first installation parts 16b, are connected together via the holes 16g formed the second installation part 16c. In other words, the friction facing material of the friction facings 15a and 15b extend into holes 16f and 16g, respectively. As the result, the extent of connections between the friction facings 15a and 15b and the first and second installation parts 16b and 16c, respectively, are relatively strong. This structure prevents the friction facings 15a and 15b from peeling off or slipping.

Although the friction facings 15a and 15b are preferably installed by molding in this embodiment, they can be installed by bonding. The bonding of friction facings 15a and 15b can be accomplished by having portions of each pair of the friction facings 15a and 15b extending into holes 16f and 16g, respectively. Then, the pairs of the friction facings 15a and 15b are bonded together as well as to the first and second installation parts 16b and 16c, respectively. Since the friction facings 15a and 15b are not installed by conventional rivets, but rather by molding or bonding, the inertia of the clutch disk assembly 1 is reduced.

The operation of the clutch assembly 1 will now be described as follows. By a conventional clutch operation, a pressure plate (not shown in the Figures) disposed on the transmission side of the cushioning plate 16 presses the cushioning plate 16 against the flywheel 51. When the pressure plate first begins to press against the cushioning plate 16, the pressure plate touches the friction facings 15a installed on the first installation parts 16b, and then the flywheel 51 touches the friction facings 15b installed on the second installation parts 16c. When further pressure is applied by the pressure plate against the cushioning plate 16, the cushioning plate 16 begins to elastically deform, mainly in a generally circular direction as shown by the broken lines in FIG. 4. This further pressure on the cushioning plate 16 results in the locations of the first installation parts 16b coinciding with the locations of the second installation parts 16c in a direction of the axis O—O. In other words, in the clutch engaged position, the first installation parts 16b lie in the same or substantially the same plane as the second installation parts 16c. The cushioning effect obtained by the elastic deformation of the cushioning plate 16 absorbs the shock, which occurs in engaging the clutch. As shown in FIG. 4, the outline of the cushioning plate 16 before elastic deformation is illustrated in a solid lines, while the outline of the cushioning plate 16 after elastic deformation is illustrated in a dotted line.

When the friction facings 15a and 15b are pressed against the flywheel 51, a torque from the flywheel 51 is input to the cushioning plate 16 via the friction facings 15a and 15b. The torque is then transmitted to the clutch plate 7 and retaining plate 6. The torque is then further transmitted to the spline hub 2 via the torsion springs 4. The torque from the spline hub 2 is then finally outputted to the main drive shaft 32.

In this embodiment, the elastic deformation of the first and second connecting parts 16d and 16e and the first and second installation parts 16b and 16c of the cushioning plate 16 in a circular direction generates a cushioning effect. Therefore, the difference is small between the elastic reaction force of the outer circumferences of the first and second installation parts 16b and 16c in a direction of the axis O—O and the elastic reaction force of the inner circumferences of the first and second installation parts 16b and 16c in a direction of the axis O—O. Moreover, the eccentric abrasion of the friction facings 15a and 15b is prevented. In addition, since the first and second installation parts 16b and 16c are alternately connected together at their outer circumferences and inner circumferences, the difference is small between the elastic reaction force of the outer circumferences of the first and second installation part 16b and 16c and the elastic reaction forces of the inner circumferences of the first and second installation parts 16b and 16c. This also results in preventing an eccentric abrasion of the friction facings 15a and 15b. Since the cushioning plate 16 has the first and second installation parts 16b and 16c lying in different planes and being connected in a circular direction, it is easy to set the elasticity of the cushioning plate 16 in a direction of the O—O axis larger compared with a prior art structure having a channel is formed between the first and second installation parts 16b and 16c.

Both the outer circumferences of one ends of the first and second installation parts 16b and 16c are connected each other by the first connecting part 16d, and both the inner circumferences of the other ends of the first and second installation parts 16b and 16c are connected each other by the second connecting part 16e. Therefore, there exists a space on the inner circumferential side of the first connecting part 16d and on the outer circumferential side of the second connecting part 16e, as shown in FIGS. 2 and 4. As the result, when the cushioning plate 16 is deformed elastically, it can expand toward the space (See FIG. 4). This results in a reduction of stresses in the cushioning plate 16 when it deforms.

In addition, the friction facings 15a and 15b, which were fixedly coupled by rivets in the past, are installed in a cushioning plate 16 by means of molding or bonding. This results in shortening of the size of the clutch disk assembly 1 in an axial direction along the rotational axis O—O. In addition, this results in the production cost of the clutch disk assembly 1 being reduced. Also the inertia of the clutch disk assembly 1 is small when the cushioning plate 16 is utilized.

Recently, the amount of torque being transmitted by a clutch has been increased due to high-powered engine and/or the increase of a car weight. When a torque transmission increases, the temperature within a transmission housing and on the friction surface of the clutch also increases. Therefore, there is a problem that the conventional friction facing made only of an organic material does not always have a sufficient life span. In this embodiment, the friction facings 15a are made of an organic material and the friction facings 15b are made of a metallic material. As the result, the characteristic of the total friction facings combines the best properties of an organic material in engagement with the best properties of a metallic material in resistance of heat and abrasion.

The clutch disk assembly 1 in accordance with the present embodiment has a structure in which the first and second installation parts 16b and 16c of the cushioning plate 16 have independently the friction facings 15a and 15b, respectively. In addition, it is possible to easily adjust the characteristic of the total friction facings by combination of a plurality of friction facings, which are made of friction materials with different kind of characteristics.

In this invention, an elastic deformation in a circular direction of first and second connecting parts 16d and 16e and first and second installation parts 16b and 16c of a cushioning plate 16 generates a cushioning effect. Therefore, the difference is small between an elastic reaction force of the outer circumference of the first and second installation parts 16b and 16c and the elastic reaction force of the inner circumference. This small difference results in a prevention of an eccentric abrasion of the friction facings.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch disk adapted to be used for transmitting a torque between a first rotary member and a second rotary member, said clutch disk comprising;
    a plurality of first and second friction facings which are adapted to be pressed against the first rotary member; and
    a cushioning plate with said first and second friction facings fixedly coupled thereto, said cushioning plate including
    a fixing part adapted to be connected with the second rotary member,
    a plurality of first installation parts extending from said fixing part toward an outer circumferential side of said cushioning plate and having said first friction facings coupled thereto,
    a plurality of second installation parts disposed between said first installation parts in a circular direction with said second installation parts being located in a different plane from said first installation parts in an axial direction and having said second friction facings coupled thereto,
    a plurality of first connecting parts disposed between first ends of said first installation parts and first ends of said second installation parts in a circular direction for connecting said first ends of said first installation parts with said first ends of said second installation parts in a circular direction, and
    a plurality of second connecting parts disposed between second ends of said first installation parts and second ends of said second installation parts in a circular direction for connecting second ends of said first installation parts with second ends of said second installation parts in a circular direction,
    said first and second connecting parts circularly coupling said first and second installation parts to form a continuous annular ring radially outward from and circumferentially around said fixing part such that each of said first and second installation parts is circumferentially supported by at least one of said first connecting parts and at least one of said second connecting parts, said first and second connecting parts being located on different radial positions.

2. A clutch disk as set forth in claim 1, wherein
said first connecting parts connect outer circumferential portions of said first ends of said first installation parts in a circular direction with outer circumferential portions of said first ends of said second installation parts in a circular direction, and said second connecting parts connect inner circumferential portions of said second ends of said first installation parts in a circular direction with inner circumferential portions of said second ends of said second installation parts in a circular direction.

3. A clutch disk as set forth in claim 1, wherein
said fixing part is located in a plane which coincides with that of said first installation parts in an axial direction.

4. A clutch disk as set forth in claim 2, wherein
said fixing part is located in a plane which coincides with that of said first installation parts in an axial direction.

5. A clutch disk as set forth in claim 1, wherein
said first and second friction facings are bonded to said first and second installation parts, respectively.

6. A clutch disk as set forth in claim 2, wherein
said first and second friction facings are bonded to said first and second installation parts, respectively.

7. A clutch disk as set forth in claim 3, wherein
said first and second friction facings are bonded to said first and second installation parts, respectively.

8. A clutch disk as set forth in claim 1, wherein
said first and second friction facings are molded onto said first and second installation parts, respectively.

9. A clutch disk as set forth in claim 2, wherein
said first and second friction facings are molded onto said first and second installation parts, respectively.

10. A clutch disk as set forth in claim 3, wherein
said first and second friction facings are molded onto said first and second installation parts, respectively.

11. A clutch disk as set forth in claim 8, wherein
a hole is formed in each of said first and second installation parts, respectively,
said first friction facings are molded on opposite surfaces of said first installation parts and in said holes formed in said first installation parts, and said second friction facings are molded on opposite surfaces of said second installation parts and in said holes formed in said second installation parts,
said first friction facings which are installed on both surfaces of said first installation parts are connected together via friction facing material located within said holes of said first installation parts, and said second friction facings which are installed on both surfaces of said second installation parts are connected via a friction facing material located within said holes of said second installation parts.

12. A clutch disk as set forth in claim 9, wherein
a hole is formed in each of said first and second installation parts, respectively,
said first friction facings are molded on opposite surfaces of said first installation parts and in said holes formed in said first installation parts, and said second friction facings are molded on opposite surfaces of said second installation parts and in said holes formed in said second installation parts,
said first friction facings which are installed on both surfaces of said first installation parts are connected together via friction facing material located within said holes of said first installation parts, and said second friction facings which are installed on both surfaces of said second installation parts are connected via a friction facing material located within said holes of said second installation parts.

13. A clutch disk as set forth in claim 10, wherein
a hole is formed in each of said first and second installation parts, respectively, said first friction facings are molded on opposite surfaces of said first installation parts and in said holes formed in said first installation parts, and said second friction facings are molded on opposite surfaces of said second installation parts and in said holes formed in said second installation parts, said first friction facings which are installed on both surfaces of said first installation parts are connected via friction facing material located within said holes of said first installation parts, and said second friction facings which are installed on both surfaces of said second installation parts are connected via a friction facing material located within said holes of said second installation parts.

14. A clutch disk assembly as set forth in claim 1, wherein said first and second connecting parts have smaller radial dimensions than said first and second installation parts.

15. A clutch disk assembly adapted to transmit a torque between a first rotary member and a second rotary member, said clutch disk assembly comprising:
- a plurality of first and second friction facings which are adapted to be pressed against the first rotary member; and
- a connecting portion adapted to be connected with the second rotary member;
- a cushioning plate fixedly coupled between said connecting portion and said first and second friction facings, said cushioning plate including
  - a fixing part fixedly coupled to said connecting portion,
  - a plurality of first installation parts extending from said fixing part toward an outer circumferential side of said cushioning plate and having said first friction facings coupled thereto,
  - a plurality of second installation parts disposed between said first installation parts in a circular direction with said second installation parts being located in a different plane from said first installation parts in an axial direction and having said second friction facings coupled thereto,
  - a plurality of first connecting parts disposed between first ends of said first installation parts and first ends of said second installation parts in a circular direction for connecting said first ends of said first installation parts with said first ends of said second installation parts in a circular direction, and
  - a plurality of second connecting parts disposed between second ends of said first installation parts and second ends of said second installation parts in a circular direction for connecting second ends of said first installation parts with second ends of said second installation parts in a circular direction,
- said first and second connecting parts circularly coupling said first and second installation parts to form a continuous annular ring radially outward from and circumferentially around said fixing part such that each of said first and second installation parts is circumferentially supported by at least one of said first connecting parts and at least one of said second connecting parts, said first and second connecting parts being located on different radial positions.

16. A clutch disk assembly as set forth in claim 15, wherein
said first connecting parts connect outer circumferential portions of said first ends of said first installation parts in a circular direction with outer circumferential portions of said first ends of said second installation parts in a circular direction, and said second connecting parts connect inner circumferential portions of said second ends of said first installation parts in a circular direction with inner circumferential portions of said second ends of said second installation parts in a circular direction.

17. A clutch disk assembly as set forth in claim 15, wherein
said fixing part is located in a plane which coincides with that of said first installation parts in an axial direction.

18. A clutch disk assembly as set forth in claim 16, wherein
said fixing part is located in a plane which coincides with that of said first installation parts in an axial direction.

19. A clutch disk assembly as set forth in claim 15, wherein
said first and second friction facings are bonded to said first and second installation parts, respectively.

20. A clutch disk assembly as set forth in claim 16, wherein
said first and second friction facings are bonded to said first and second installation parts, respectively.

21. A clutch disk assembly as set forth in claim 17, wherein
said first and second friction facings are bonded to said first and second installation parts, respectively.

22. A clutch disk assembly as set forth in claim 15, wherein
said first and second friction facings are molded onto said first and second installation parts, respectively.

23. A clutch disk assembly as set forth in claim 16, wherein
said first and second friction facings are molded onto said first and second installation parts, respectively.

24. A clutch disk assembly as set forth in claim 17, wherein
said first and second friction facings are molded onto said first and second installation parts, respectively.

25. A clutch disk assembly as set forth in claim 22, wherein
a hole is formed in each of said first and second installation parts, respectively,
said first friction facings are molded on opposite surfaces of said first installation parts and in said holes formed in said first installation parts, and said second friction facings are molded on opposite surfaces of said second installation parts and in said holes formed in said second installation parts,
said first friction facings which are installed on both surfaces of said first installation parts are connected together via friction facing material located within said holes of said first installation parts, and said second friction facings which are installed on both surfaces of said second installation parts are connected together via a friction facing material located within said holes of said second installation parts.

26. A clutch disk assembly as set forth in claim 23, wherein
a hole is formed in each of said first and second installation parts, respectively,
said first friction facings are molded on opposite surfaces of said first installation parts and in said holes formed in said first installation parts, and said second friction facings are molded on opposite surfaces of said second installation parts and in said holes formed in said second installation parts, said first friction facings which are installed on both surfaces of said first installation parts are connected together via friction facing material located within said holes of said first installation parts, and said second friction facings which are installed on both surfaces of said second installation parts are connected together via a friction facing material located within said holes of said second installation parts.

27. A clutch disk assembly as set forth in claim 24, wherein a hole is formed in each of said first and second installation parts, respectively, said first friction facings are molded on opposite surfaces of said first installation parts and in said holes formed in said first installation parts, and said second friction facings are molded on opposite surfaces of said second installation parts and in said holes formed in said second installation parts, said first friction facings which are installed on both surfaces of said first installation parts are connected together via friction facing material located within said holes of said first installation parts, and said second friction facings which are installed on both surfaces of said second installation parts are connected together via a friction facing material located within said holes of said second installation parts.

28. A clutch disk assembly as set forth in claim 15, wherein said connecting portion includes a center bore with a non-circular cross-section.

29. A clutch disk assembly as set forth in claim 15, wherein said connecting portion includes an elastic coupling assembly.

30. A clutch disk assembly as set forth in claim 15, wherein said first friction facings are constructed of a different material from said second friction facings.

31. A clutch disk assembly as set forth in claim 30, wherein said first friction facings are constructed of an organic material, and said second friction facings are constructed of a metallic material.

32. A clutch disk assembly as set forth in claim 15, wherein said first and second connecting parts have smaller radial dimensions than said first and second installation parts.

* * * * *